Patented Dec. 6, 1932

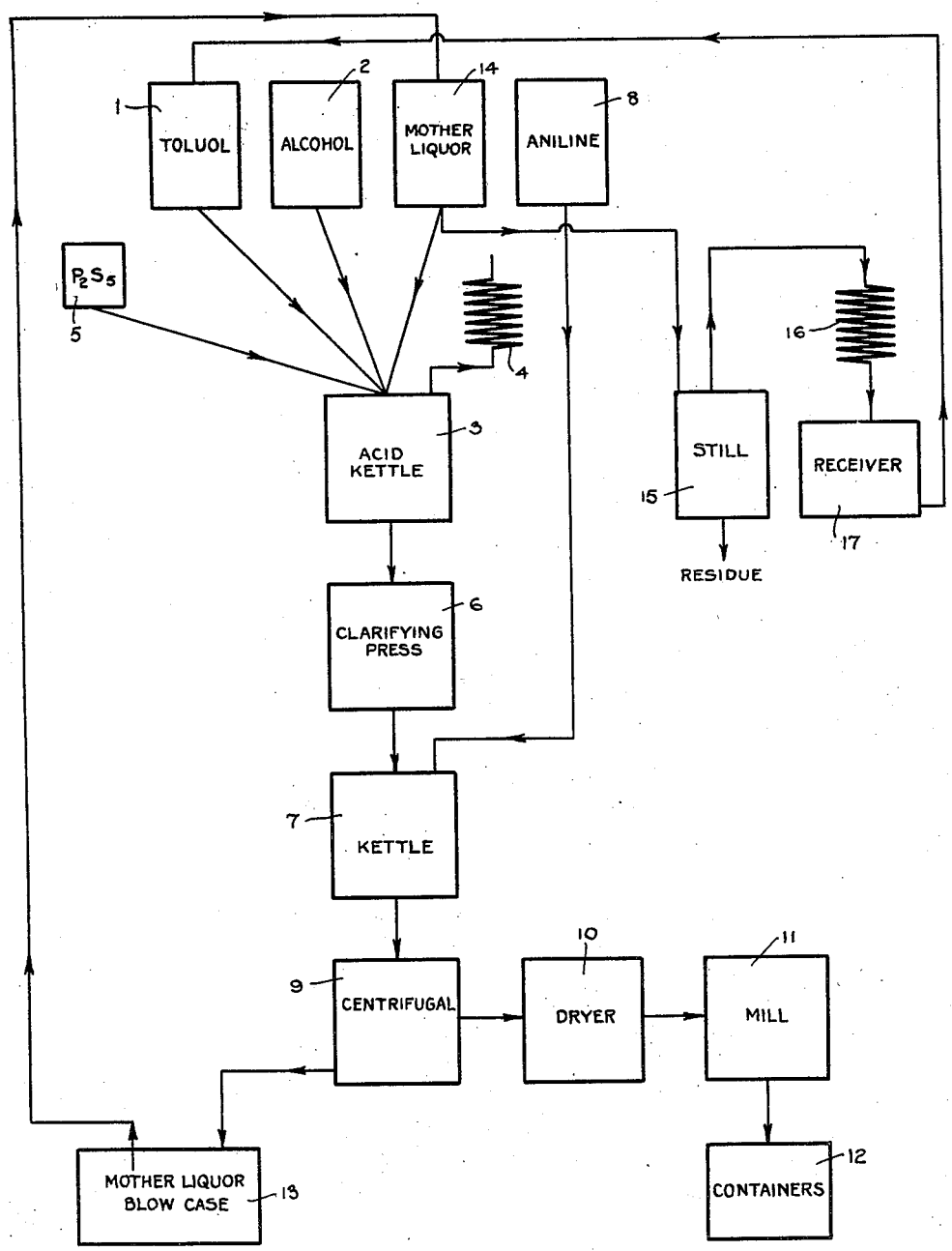

1,889,943

UNITED STATES PATENT OFFICE

GEORGE BARSKY, OF NEW YORK, N Y., AND RALPH V. HEUSER, OF CRANFORD, NEW JERSEY, ASSIGNORS TO AMERICAN CYANAMID COMPANY, OF NEW YORK, N. Y., A CORPORATION OF MAINE

METHOD OF MAKING DITHIOPHOSPHATES

Application filed August 8, 1929. Serial No. 384,440.

This invention relates to the manufacture of di-thiophosphates including both aryl and alkyl phosphates and also including both the free acids and salts thereof.

Generally di-thiophosphates may be made by the reaction of phosphorus pentasulphide on suitable organic oxygen containing compounds such as the alcohols and the phenols. Because the phosphorus pentasulphide used invariably contains a considerable amount of impurities, and because by-products are formed, it becomes necessary to subject the crude product to purification operations which are burdensome.

The present invention is intended to provide a method of manufacture of di-thiophosphates which avoids the necessity of first making a crude product and then purifying the same.

In practicing this invention we provide an organic solvent in the reaction vessel which solvent is effective for the solution of both the alcoholic body and the resulting di-thiophosphate. The solvent may be a liquid di-thiophosphate, as for example, the di-thiophosphoric acid obtained by the use of the alcoholic body desired or the solvent may be an aromatic hydrocarbon such as toluol, benzol, chlor-benzol and the like, or it may be a mixture of two or more solvents, such as toluol and carbon tetrachloride. Of course, other organic solvents may be used, it being essential only that the solvent be a non-solvent for the aforesaid impurities.

Various procedures may be followed in adapting our idea to commercial practice. For example, in the making of aniline di-isopropyl di-thiophosphate, we provide a solvent of toluol or of a mixture of 85 parts of toluol and 15 parts of carbon tetrachloride to which is added phosphorus pentasulphide and iso-propyl alcohol in the proper proportions to react to give di-iso-propyl di-thiophosphoric acid. The reaction proceeds initially with vigor without the application of heat, but toward the end of the reaction it is necessary to heat the mixture in order to cause complete combination. The resulting solution is filtered and to the filtrate is added a sufficient thiophosphoric acid formed, the neutralization causing the product to precipitate from the solvent. The product is filtered, washed and dried and the mother liquor is returned to the reaction vessel for further use. The solvent mixture, after being used a number of times, accumulates impurities which interfere with the crystallization of pure aniline salt of di-iso-propyl di-thiophosphoric acid so that it becomes necessary from time to time to redistill the solvent.

In the preparation of some di-thiophosphates the initial reaction is so vigorous as to make it difficult to control the reaction without overheating and in such case we add to the solvent all of the phosphorus pentasulphide to be used in the preparation and add the liquid alcoholic body gradually, thereby causing the reaction to proceed smoothly.

In another embodiment of our invention we may use the di-thiophosphoric acid, produced in a previous operation, as the solvent. In such case we place the di-thiophosphoric acid in the reaction vessel, add thereto the phosphorus pentasulphide and alcoholic body, causing the reaction to take place. The product is filtered and to the filtrate is added an amount of sodium carbonate less than the amount necessary to combine with all of the di-thiophosphoric acid, whereupon the sodium salt of the di-thiophosphoric acid precipitates and may be removed by filtration, washed and dried. The mother liquor which contains the excess of uncombined di-thiophosphoric acid is returned to the reaction vessel for re-use. After the accumulation of a considerable amount of impurity in the solvent, it may be discarded or may be purified for further use.

A solvent such as described above, for example, toluol or a mixture of toluol and carbon tetrachloride, may be used in a similar manner as just above described for the purification of salts of the di-thiophosphoric acids. For example, we may dissolve impure aniline di-iso-propyl di-thiophosphate, in said solvent mixture at a temperature of say 60° C., cool the solution to 20° C. whereupon the major portion of the di-thiophosphate character of agitation during the cooling controls the character of the crystals, which may be varied in size by proper control of the conditions of crystallization. The resulting liquor may be re-used a number of times, after which the accumulation of impurities therein renders it desirable to redistill or otherwise purify the same.

The single figure of the accompanying drawing is a flow sheet showing one of the procedures, in accordance with the above description of the invention.

Toluol 1, and alcohol 2 are mixed in the reaction kettle 3, having a reflux condenser 4 attached thereto. The phosphorus pentasulphide 5 is added to the reaction kettle 3, the reaction proceeding with the evolution of heat and any vaporized materials are condensed at 4 and returned to the vessel.

After the completion of the reaction as above described, the product is run through a press 6 to filter out the insoluble impurities and the clear liquor is run into the kettle 7. Aniline 8 is then mixed with the di-thiophosphoric acid in the kettle 7, precipitating out the aniline salt thereof which is separated from the mother liquor in the centrifugal 9. The product is passed through a drier 10, after which it is ground in mill 11, to the proper size and is then packed in containers 12. The mother liquor 13 from the wringer 9 is transferred to the storage vessel 14 from which it is added to the reaction kettle 3 as desired. After the mother liquor becomes more or less saturated with impurities, it is run into still 15, provided with condenser 16 and distilled to recover the solvent in receiver 17, the solvent being returned to container 1.

Above we have described several embodiments of our invention setting forth various procedures which we have found to be effective in the carrying out of our idea of using a solvent in the production of pure dithiophosphates. Our invention is, of course, not limited to the details of procedure above set forth, nor to the proportions of materials, temperatures and times of reaction as all these factors may be varied within extremely wide limits with good results, all of which is apparent to the skilled operator. In the above examples, we have mentioned only a few solvents, but, of course, other solvents may be substituted therefor. The specific examples given included the use of isopropyl alcohol. Other alcohols are equally well adapted for our purpose, as for example, methyl alcohol, ethyl alcohol and the like, phenols and other aromatic hydroxy bodies, and substitution products of the above. These and other variations may be made in our invention without departing from the spirit thereof, the scope of the invention being set forth in the claims appended hereto.

What we claim is:

1. A method of making dithiophosphates which comprises reacting a compound selected from a group consisting of aliphatic monohydroxy alcohols and phenols, with phosphorus pentasulphide in the presence of an organic compound which is a solvent for said alcoholic body and the dithiophosphate formed, and recovering the dithiophosphate.

2. A method of making dithophosphates which comprises reacting a compound selected from a group consisting of aliphatic monohydroxy alcohols and phenols, with phosphorus pentasulphide in the presence of an organic compound which is a solvent for said alcoholic body and the dithiophosphate formed, filtering the reaction product and recovering the dithiophosphate from the filtrate.

3. A method of making dithiophosphates which comprises reacting a compound selected from a group consisting of aliphatic monohydroxy alcohols and phenols, with phosphorus pentasulphide in the presence of an organic compound which is a solvent for said alcoholic body and the dithiophosphate formed, filtering the reaction product, adding an alkaline material to the filtrate, and recovering the dithiophosphate.

4. A method of making dithiophosphates which comprises reacting a compound selected from a group consisting of aliphatic monohydroxy alcohols and phenols, with phosphorus pentasulphide in the presence of an organic compound which is a solvent for said alcoholic body and the dithiophosphate formed, filtering the reaction product, adding an alkaline material to the filtrate, recovering the dithiophosphate and returning the mother liquor to the reaction.

5. A method of making dithiophosphates which comprises reacting a compound selected from a group consisting of aliphatic monohydroxy alcohols and phenols, with phosphorus pentasulphide in the presence of an organic compound which is a solvent for said alcoholic body and the dithiophosphate formed, filtering the reaction product, adding aniline to the filtrate, and recovering the dithiophosphate.

6. A method of making dithiophosphates which comprises reacting a compound selected from a group consisting of aliphatic monohydroxy alcohols and phenols, with phosphorus pentasulphide in the presence of a benzene hydrocarbon, and recovering the dithiophosphate.

7. A method of making dithiophosphates which comprises reacting a compound selected from a group consisting of aliphatic monohydroxy alcohols and phenols, with phosphorus pentasulphide in the presence of a toluol containing solvent.

8. A method of making dithiophosphates which comprises providing a mixture of a compound selected from a group consisting of aliphatic monohydroxy alcohols and phenols, phosphorus pentasulphide and an organic solvent for the dithiophosphate, heating the mixture to cause a reaction to occur to form a dithiophosphate, cooling the product and recovering the dithiophosphate.

9. A method of making dithiophosphates which comprises reacting a compound selected from a group consisting of aliphatic monohydroxy alcohols and phenols, with phosphorus pentasulphide in the presence of an organic compound which is a solvent for said alcoholic body and the dithiophosphate formed, adding an alkaline material in an amount insufficient to neutralize the product, recovering the dithiophosphate and returning the mother liquor to the reaction.

10. A method of making dithiophosphates which comprises reacting a compound selected from a group consisting of aliphatic monohydroxy alcohols and phenols, with phosphorus pentasulphide in the presence of an organic compound which is a solvent for said alcoholic body and the dithiophosphate formed, adding an alkaline carbonate in an amount insufficient to neutralize the product, recovering the dithiophosphate and returning the mother liquor to the reaction.

11. A method of making dithiophosphates which comprises reacting a compound selected from a group consisting of aliphatic monohydroxy alcohols and phenols, with phosphorus pentasulphide in the presence of a dithiophosphate as a solvent, said dithiophosphate corresponding with that to be formed, adding an alkaline material in an amount insufficient to neutralize the product, recovering the dithiophosphate and returning the mother liquor to the reaction.

12. The process of claim 3 in which the dithiophosphate is precipitated by cooling the solution.

13. In a method of making dithiophosphates by reaction between phosphorus pentasulphide and a compound selected from a group consisting of aliphatic monohydroxy alcohols and phenols, in the presence of an organic solvent for the alcoholic body and the dithiophosphate, the step which comprises mixing the phosphorus pentasulphide with the organic solvent and then gradually adding the alcoholic body to said mixture to avoid a violent reaction.

In testimony whereof, we have hereunto subscribed our names this 6th day of August 1929.

GEORGE BARSKY.
RALPH V. HEUSER.